(12) United States Patent
Okumura et al.

(10) Patent No.: US 6,384,417 B1
(45) Date of Patent: May 7, 2002

(54) CERAMIC SCINTILLATOR, METHOD FOR PRODUCING SAME, AND X-RAY DETECTOR AND X-RAY CT IMAGING EQUIPMENT USING SAME

(75) Inventors: Miwa Okumura, Kawasaki; Masaaki Tamatani, Fujisawa; Naotoshi Matsuda, Chigasaki; Takeshi Takahara; Yukihiro Fukuta, both of Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/407,760

(22) Filed: Sep. 29, 1999

(30) Foreign Application Priority Data

Sep. 30, 1998 (JP) ............................................. 10-277724

(51) Int. Cl.⁷ .................................................. G01T 1/00
(52) U.S. Cl. ........................................ 250/367; 250/368
(58) Field of Search ................................. 250/367, 368, 250/370.11, 483.1

(56) References Cited

U.S. PATENT DOCUMENTS

| 4,242,221 A | * | 12/1980 | Cusano et al. ............ 252/301.4 |
| 4,525,628 A | * | 6/1985 | DiBianca et al. ............ 250/367 |
| 4,870,279 A | * | 9/1989 | Cueman et al. ............ 250/368 |
| 5,484,750 A | * | 1/1996 | Greskovich et al. ............ 501/86 |
| 5,506,409 A | * | 4/1996 | Yoshida et al. ............ 250/368 |
| 5,518,658 A | * | 5/1996 | Rossner et al. ............ 252/301.4 |
| 5,521,387 A | * | 5/1996 | Riedner et al. ............ 250/367 |
| 5,831,269 A | * | 11/1998 | Nakamura et al. ............ 250/367 |
| 5,866,908 A | * | 2/1999 | Novak ............ 250/368 |
| 5,882,547 A | * | 3/1999 | Lynch et al. ............ 252/301.4 |
| 6,270,702 B1 | * | 8/2001 | Leppert ............ 264/21 |

FOREIGN PATENT DOCUMENTS

| JP | 5-279663 | 10/1993 |
| JP | 6-28312 | 2/1994 |
| JP | 6-201834 | 7/1994 |

* cited by examiner

Primary Examiner—Constantine Hannaher
Assistant Examiner—Otilia Gabor
(74) Attorney, Agent, or Firm—Oblon, Spivak, McClelland, Maier & Neustadt, P.C.

(57) ABSTRACT

A sintered body of a rare earth oxysulfide is heat-treated at a temperature of 900° C. to 1200° C. in an atmosphere of a mixture of sulfur and oxygen to form island-like rare earth oxide phases on the surface of the sintered body to produce a ceramic scintillator. Therefore, the ceramic scintillator comprises a sintered body of a rare earth oxysulfide, and a rare earth oxide phase formed on the surface of the sintered body, wherein a rare earth oxysulfide phase or the rare earth oxide phase is dispersed on the surface of the sintered body, so that the optical output characteristic of the ceramic scintillator is improved. According to this ceramic scintillator, it is possible to remove the pressure and distortion during sintering, the coloring caused by the deviation from the stoichiometric composition, and the coloring caused during processing such as saw-cutting and polishing.

8 Claims, 7 Drawing Sheets

| EXAMPLES | SULFIDE | HEAT TREATMENT | PROPORTION OF $Gd_2O_3$ PHASE | OPTICAL OUTPUT ($CdWO_4$ ST'D) |
|---|---|---|---|---|
| 3 | $BaGa_2S_4$ | 1100°C 5h | 50% | 190% |
| 4 | $CaLa_2S_4$ | 1100°C 5h | 70% | 189% |
| 5 | $Y_2O_2S$ | 1100°C 5h | 60% | 189% |
| 6 | $Gd_2O_2S$ | 1000°C 10h | 82% | 187% |
| 7 | ZnS | 1000°C 5h | 60% | 190% |
| 8 | S | 900°C 5h | 50% | 150% |
| 9 | $Y_2O_2S$:Eu | 1150°C 5h | 80% | 180% |
| 10 | ZnS:Ag | 1000°C 2h | 40% | 180% |
| 11 | $Gd_2O_2S$:Tb | 1100°C 5h | 40% | 190% |
| 12 | $CaGa_2S_4$ | 1100°C 5h | 40% | 190% |
| 13 | $Y_2O_2S$:Tb | 1150°C 5h | 80% | 190% |
| 14 | $Gd_2O_2S$:Eu | 1100°C 5h | 40% | 190% |

FIG.7

| EXAMPLES | STARTING MATERIALS | SULFIDE | HEAT TREATMENT | PROPORTION OF $Gd_2O_3$ PHASE | OPTICAL OUTPUT ($CdWO_4$ ST'D) |
|---|---|---|---|---|---|
| 16 | $Gd_2O_2S$:Pr,Ce | S | 1100°C 5h | 80% | 150% |
| 17 | $Gd_2O_2S$:Tb | S | 1100°C 5h | 80% | 150% |
| 18 | $Gd_2O_2S$:Eu | S | 1100°C 5h | 80% | 150% |

CERAMIC SCINTILLATOR, METHOD FOR PRODUCING SAME, AND X-RAY DETECTOR AND X-RAY CT IMAGING EQUIPMENT USING SAME

BACKGROUND OF THE INVENTION

The present invention relates generally to a ceramic scintillator and a method for producing the same. More specifically, the invention relates to a ceramic scintillator suitable for a radiation detector for detecting radioactive rays, such as X-rays, γ-rays and neutrons, and a method for producing the same.

Figure 1:
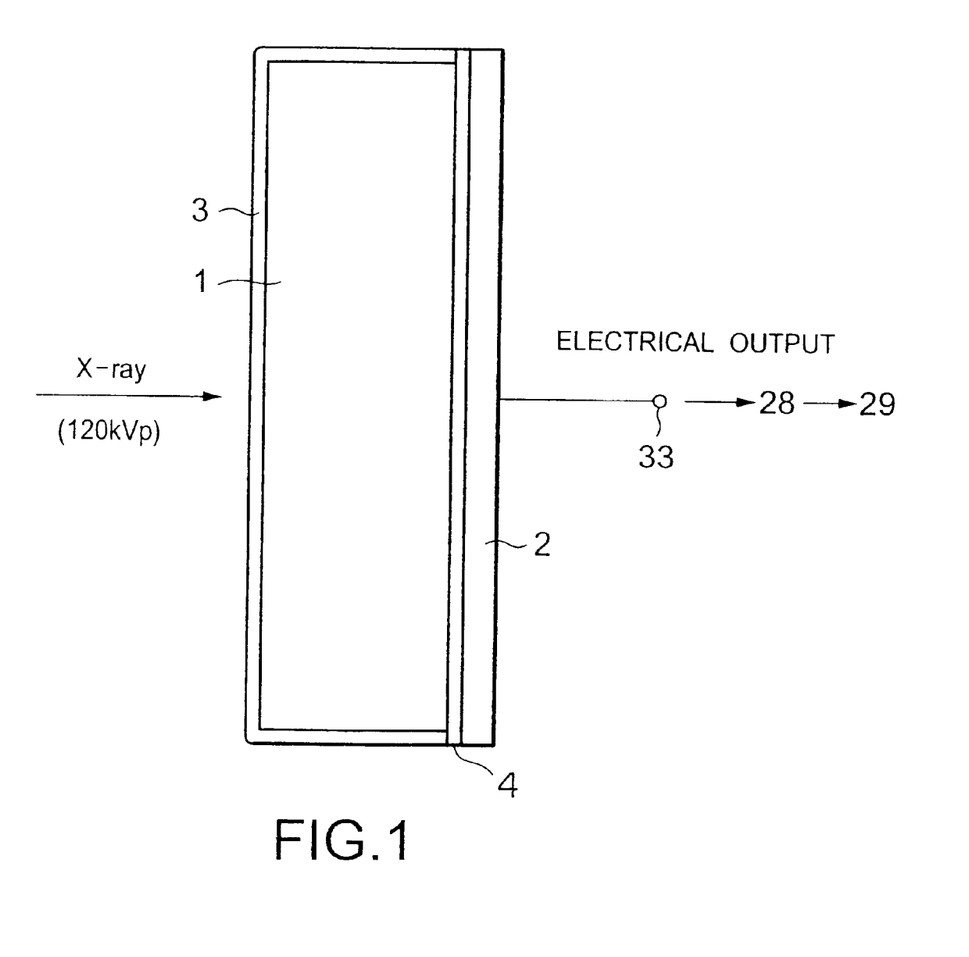
FIG. 1 is a sectional view showing a schematic construction of a radiation detector using a ceramic scintillator.

A scintillator (a fluorescent material) is a material for radiating electromagnetic waves, which have wavelengths in the visible or nearly visible spectral regions, by the stimulation of radioactive rays, such as X-rays. The scintillator is used for, e.g., a radiation detector of an X-ray CT (Computed Tomography) equipment as a scintillation counter. FIG. 1 shows a schematic construction of a radiation detector of an X-ray CT equipment.

In this figure, the radiation detector comprises a scintillator 1, a visible light reflective film 3 for covering the whole surface of the scintillator 1 except for a part thereof, a photodiode 2 placed on the part of the scintillator which is not covered with the reflective film 3 and optically coupled with the scintillator 1 through an adhesive layer 4, and an output terminal 33. The reflective film allows the transmission of radioactive rays and reflects visible light. Output electric current from the photodiode is produced in accordance with the quantity of visible light emitted from the scintillator by the stimulation of X-rays being incident thereon through an object in a direction of the arrow in the figure. The output current is transferred to a computer for data accumulation and processing.

For the scintillator 1 of this type thus provided in the radiation detector, it is required that the conversion efficiency from X-rays to visible light should be high, that the afterglow of the scintillator should be short, that the light output of the scintillator should not be reduced (should be stable) under long-term or repeated exposure of X-rays.

Conventionally, for such a scintillator, there are known single crystalline substances, such as cadmium tungstate ($CdWO_4$), sodium iodide (NaI) and cesium iodide (CsI); rare earth oxide ceramics; rare earth oxysulfide ceramics.

Representative rare earth oxysulfides are praseodymium-, terbium- and europium-activated rare earth oxysulfide ($M_2O_2S:Pr$, $M_2O_2S:Tb$ and $M_2O_2S:Eu$; M denotes at least one of elements of La, Gd, Y and Lu ). In particular, praseodymium-activated gadolinium oxysulfide ceramics, such as $Gd_2O_2S:Pr$ and $Gd_2O_2S:Pr,Ce$, have a large X-ray absorption coefficient and a short afterglow time of light emission, so that these ceramics are preferably used for an X-ray detecting scintillator.

This type of ceramic scintillator is desirable to be transparent or translucent in order to obtain a high detection sensitivity. To meet this request, the above described rare earth oxysulfide ceramics are prepared by sintering raw material powder under high pressure at high temperature, using, e.g., the hot pressing or the hot isostatic pressing (HIP) techniques. A ceramic scintillator is then obtained by cutting the resulting sintered ceramic ingot so as to have desired shape and size with the blade-saw or the wire-saw.

As-sintered scintillators thus prepared are usually body-colored in gray to blackish hue, which may be related to microscopic distortion or slight deviation in chemical composition from the stoichiometric one induced inside the ingot during the sintering. The coloring reduces the light output efficiency, since a part of emitted light inside the ceramics is absorbed by the colored body before going out of it. Furthermore, the distortion and deviation in the composition make afterglow longer and reduce the light output efficiency of the scintillator under long-term or repeated X-ray irradiation. In order to remove such coloring in the scintillator, it was attempted to carry out a heat treatment at a temperature of 800 to 1400° C. in an atmosphere of a mixed gas of hydrogen or hydrogen sulfide and an inert gas. However, it was not possible to completely remove the coloring.

Moreover, in the process cutting the scintillators out of the ingot, a scintillator surface layer of 3 to 5 μm is crushed and damaged. This surface layer is also colored in brown-orange hue, the hue intensity depending on the roughness of the sawing procedure. The hue is almost the same as that which is produced in the raw material powder under strong milling and characteristic of gadolinium oxysulfide. This coloring also reduces the optical output efficiency of the scintillator. In order to remove the coloring of the surface layer, it has been proposed for the surface layer to be washed out with an etching reagent. It was possible to remove the coloring of the scintillator surface by this method, but it was not possible to remove the coloring induced inside the scintillator during the sintering. Moreover, the etching reagent sometimes penetrates deep into grain boundaries to form grooves of about 30 to 50 μm on the surface of the scintillator. These grooves confine the emitted light within them, causing problems of deterioration in the optical coupling and the optical output when a photo-detector, such as a photodiode, is incorporated.

In order to remove both of the internal and surface colorings caused during sintering and by the cutting process, a heat treatment was proposed to carry out in an inert atmosphere containing oxygen of 0.5 to 200 ppm (see Japanese Patent Laid-Open No. 6-201834).

According to this method, it is possible to improve light output efficiency, probably due to removal of the microscopic distortion in the ceramics and to the reduction in the number of oxygen deficiencies in the scintillator crystalline lattices by supplying oxygen. However, it is not possible to remove completely the long part of the afterglow and to improve the stability under X-ray irradiation, probably since it could not reduce the number of sulfur deficiencies in the scintillator. In addition, the surface is covered with an $M_2O_3$ layer or $M_2O_2SO_4$ layer which have a long afterglow and low luminous efficiency. M is yttrium (Y), Lanthanum (La), gadolinum (GD) or the like.

The addition of these inferior properties of the surface layer cancelled partly the improvement in the properties performed inside the scintillator by this method. Furthermore, variation in the performance among scintillator pieces remains large, probably since the sulfur deficiency remains unevenly inside the ceramics ingot.

SUMMARY OF THE INVENTION

It is therefore an object of the present invention to eliminate the aforementioned problems and to provide a ceramic scintillator, which has a high optical output characteristic, a short afterglow and an excellent stability, by removing the internal coloring produced during the sintering of a ceramic and removing the surface coloring produced during cutting.

In order to accomplish the aforementioned and other objects, according to a first aspect of the present invention, there is provided a method for producing a ceramic scintillator, the method comprising the steps of: producing at least one of $SO_2$ and $SO_3$; and allowing the at least one of $SO_2$ and $SO_3$ to react with the sintered body of the rare earth oxysulfide at a temperature of 900 to 1200° C. to form a rare earth oxide phase on the surface of the sintered body.

According to a second aspect of the present invention, the ceramic scintillator producing method further comprises the steps of: placing a sintered body of a rare earth oxysulfide and a sulfide material in a substantially sealed container containing oxygen; and heat-treating the sintered body and the sulfide material at a temperature of 900 to 1200° C.

By adopting the ceramic scintillator producing method according to any one of the first and second aspects, it is possible to remove the oxygen deficiency and sulfur deficiency produced during sintering, so that it is possible to improve the optical output of the scintillator, to reduce the afterglow thereof and the deterioration thereof under repeated X-ray irradiation.

According to a third aspect of the present invention, a ceramic scintillator comprises a sintered body of a rare earth oxysulfide, and a rare earth oxide phase formed on the surface of the sintered body, wherein a rare earth oxysulfide phase or the rare earth oxide phase is dispersed on the surface of the sintered body. With this construction, it is possible to improve the luminous efficiency of the scintillator and to reduce the afterglow thereof and the deterioration thereof under X-ray irradiation.

According to a fourth aspect of the present invention, a ceramic scintillator comprises a sintered body of a rare earth oxysulfide, and a rare earth oxide phase formed on the surface of the sintered body, wherein the mean surface roughness Ra is greater than or equal to 0.01 $\mu$m and smaller than or equal to 0.8 $\mu$m. With this construction, it is possible to improve the matching characteristic of the ceramic scintillator with a photodiode or the like, which is optically coupled with the scintillator, so that it is possible to improve the optical output characteristic of the scintillator.

DESCRIPTION OF THE PREFERRED EMBODIMENTS

Referring to the accompanying drawings, the preferred embodiments of a ceramic scintillator and a method for producing the same according to the present invention will be described in detail below.

Preferably, the rare earth oxysulfides for use in a ceramic scintillator according to the present invention include $(M_{1-x}Pr_x)_2O_2S$, $(M_{1-x}(Pr,Ce))_2O_2S$, $(M_{1-y}Tb_y)_2O_2S$, and $(M_{1-z}Eu_z)_2O_2S$ (M denotes yttrium (Y), lanthanum (La), gadolinium (Gd), lutetium (Lu), or the like). More preferably, M is Gd since Gd has a large X-ray absorption coefficient. The luminous efficiency decreases when the activator concentrations x, y and z are too low or too high; the values of x, y and z are preferably set to be in ranges of $0.0001<x<0.01$, $0.001<y<0.2$, and $0.001<z<0.2$, respectively.

In the first preferred embodiment of a ceramic scintillator according to the present invention, the fact that a rare earth oxysulfide phase or a rare earth oxide phase is in a dispersed state means a state wherein island-like rare earth oxide phases are dispersed on the surface of a sintered body of a rare earth oxysulfide, or a state wherein island-like outcrops of a rare earth oxysulfide constituting a sintered body are dispersed while the sintered body is covered with a rare earth oxide phase.

The dispersed state is a state wherein the percentage of the area of the rare earth oxide phase with respect to the surface area of the scintillator is preferably 10% or higher and 90% or less, more preferably 80% or less. When the percentage is too high, the performance of the scintillator deteriorates because the oxide phase has low light output efficiency, long afterglow and low stability under X-ray irradiation. On the other hand, the coloring is not completely removed and decreases the light output when the percentage is too low, since oxygen is not sufficiently supplied to remove the oxygen deficiency in side the scintillator.

In order to obtain such a ceramic scintillator, $SO_2$ or $SO_3$ is allowed to react with a rare earth oxysulfide. Specifically, the sintered body of the rare earth oxysulfide is heated in an atmosphere containing sulfur and oxygen. The percentage of the number of sulfur atoms to that of oxygen atoms is preferably in the range of 1% to 50%. If the percentage exceeds 50%, an orange-colored $Gd_2S_3$ phase is consequently formed on the surface of the sintered body, so that the optical output decreases. On the other hand, the percentage less than 1% is not sufficient to remove the sulfur deficiency of the ceramic scintillator.

Figure 2:
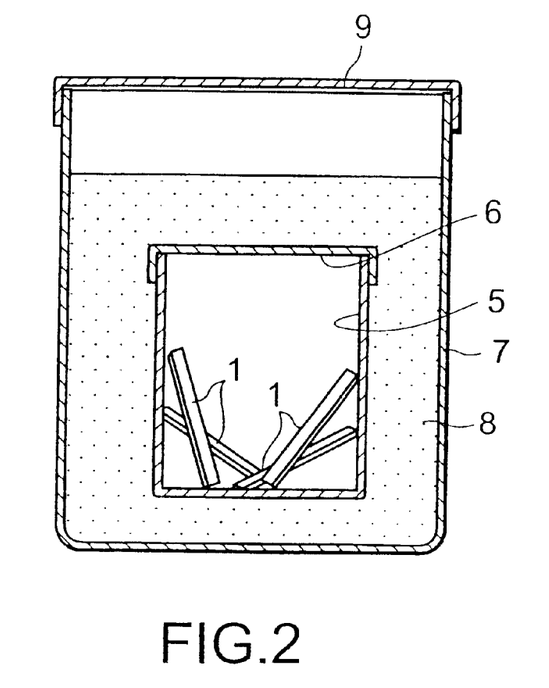
FIG. 2 is a sectional view schematically showing a double crucible using the first preferred embodiment of a ceramic scintillator and a method for producing the same according to the present invention.

In order to obtain the $S_2$ or $SO_3$ atmosphere, a gas containing $SO_2$ or $SO_3$ may be allowed to pass over the ceramic scintillator. Here the carrier gas does not contain a large amount of oxygen, and is preferably nitrogen and/or rare gas such as argon. Alternatively, it is advantageous to use a double crucible system which industrially has a better reproducibility and which is suitable to achieve mass production. In this system, as shown in FIG. 2, scintillator pieces 1 are put in a small crucible 5, and then, the small crucible 5 is covered with a small lid 6 and put in a large crucible 7. Then, the surrounding of the small crucible 5 is filled with sulfide powder 8, and the large crucible 7 is covered with a large lid 9. This double crucible is put in a furnace (not shown) to be heated in air.

The sulfide is preferably a material which generates $SO_2$ or $SO_3$ by its decomposition or by reaction with oxygen at a temperature of up to a heat treatment temperature or at a heat treatment temperature. The form thereof is powder preferably. For example, a rare earth oxysulfide ($M_2O_2S$), zinc sulfide (ZnS), alkaline earth gallium sulfide($AGa_2S_4$), and/or alkaline earth rare earth sulfide ($AM_2S_4$) are used as a sulfide to accomplish the object of the present invention. Here, A denotes an alkaline earth element. These materials may be pure compounds. Phosphors containing activators, such as $M_2O_2S$:Pr, $M_2O_2S$:Eu, $M_2O_2S$: Tb, ZnS:Ag and ZnS:Cu, also may be used when host materials of the phosphors are of these materials. A simple substance of sulfur, which is not a compound, may be also used.

This double crucible system blocks the air penetration from the outside into the space of the small crucible 5, and allows the atmosphere in the small crucible 5 to contain $SO_2$ or $SO_3$ during the heat treatment. A structure wherein three or more crucibles are combined one over another may be used for preventing the sulfide powder penetration into the small crucible 5. Single crucible system may be used for the present purpose in the case that the scintillators can react with $SO_2$ or $SO_3$ generated from the sulfide placed together with the scintillator. In this case, however, air penetration should be avoided by such means of use of inert atmosphere during the heat teratment. Further, when the scintillator makes contact with the sulfide powder, then irregularity tend to be caused on the scintillator surface by some reactions between them. The ceramic scintillator may be placed in a box made of a sintered body of the above described sulfide to accomplish the same object. The box may be heated directly or in a crucible placed in a furnace.

The heat treatment temperature is preferably in the range of 900 to 1200° C. When the heat treatment temperature exceeds 1200° C., a surface thermal etching phenomenon occurs. The etched surface scatters light to reduce the light output efficiency. When the heat treatment temperature is less than 900° C., sulfur and oxygen do not diffuse sufficiently into the ceramic, so that it is not possible to obtain the advantages of the present invention. The heating time is preferably 1 hour or more and less than 24 hours. When the heating time is less than 1 hour, sulfur and oxygen do not sufficiently diffuse into the ceramic scintillator. When the heating time exceeds 24 hours, the possibility of air penetration into the space wherein the scintillators are placed increases, since the filled sulfide powder is consumed by the reaction with the air.

Figure 3:
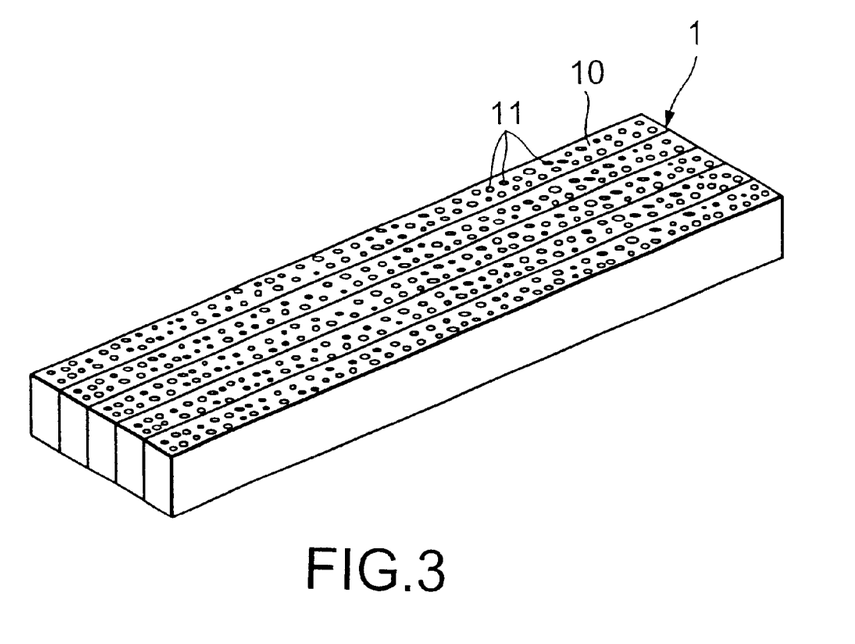
FIG. 3 is a perspective view of a ceramic scintillator, on the surface of which an oxysulfide phase and an oxide phase are deposited.

As described above, when the ceramic scintillator is heat treated in an atmosphere of $SO_2$ or $SO_3$ by, e.g., the double crucible 5, 7 filled with the sulfide powder 8 shown in FIG. 2, it is possible to obtain the scintillator 1 of the present invention wherein oxysulfide phases appear on the surface as shown in FIG. 3. In FIG. 3, the ceramic scintillator piece 1 is a rod-like scintillator having, e.g., a thickness of about 2 mm, a width of about 1 mm and a length of about 30 mm.

The oxide phase and oxysulfide phase can be distinguished using color cathodo-luminescence image observation, since the oxide phase emits light differently colored from the oxysulfide phase. In case of $Gd_2O_2S$: Pr, the oxide phase emits red light, while the oxysulfide phase emits green light. The ceramic scintillator has a green-emitting base material 10, and a large number of red-emitting island parts 11 of oxide phase deposited in the base material 10. The oxide phase of the island parts 11 in the surface layer may be abraded to be lost in the after-treatment process for the scintillator. However, if scintillators are heat treated in a condition described above to form oxide phase islands dispersed on a scintillator surface, it is not only possible to remove the oxygen deficiency, but it is also possible to remove the sulfur deficiency, so that it is possible to remove the coloring induced during the sintering process inside the scintillator pieces.

Figure 4:
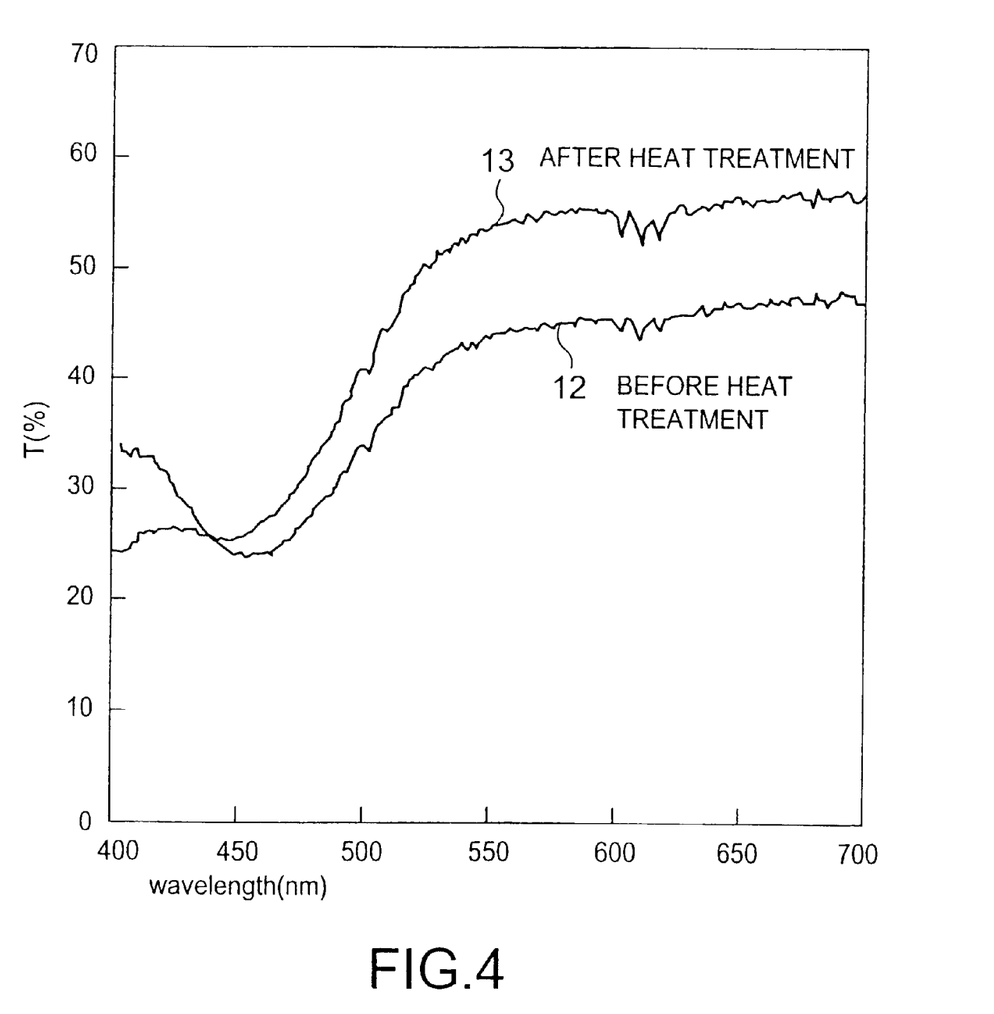
FIG. 4 is a graph showing a light transmission spectra of the first preferred embodiment of a ceramic scintillator according to the present invention.

FIG. 4 shows the spectral transmittance for the scintillators before and after the heat tretament in an atmosphere of a mixture of sulfur and oxygen. In FIG. 4, the ordinate denotes the total light transmittance T, and the abscissa denotes the wavelength of light. Comparing a curve 13 after the heat treatment with a curve 12 before the heat treatment, it can been seen that the transmittance in each of green and red spectral regions increases. The increase in transmittance is about 10% at a wavelength of 500 nm.

In addition, the surface of a ceramic scintillator having a rare earth oxide phase on the surface of a rare earth oxysulfide is preferably smooth. Specifically, the mean surface roughness Ra of the ceramic scintillator is preferably in the range of from 0.01 to 0.80 µm. If the mean surface roughness Ra exceeds 0.80 µm, the scattering of light increases, so that the loss of light due to the multiple scattering increases to cause luminous efficiency decrease. Even when the mean surface roughness Ra is decreased to be less than 0.01 µm, the luminous efficiency is not further improved.

For example, if etching is carried out with an acid etching reagent, the roughness Ra is usually higher than 0.50 µm. The surface roughness Ra can be decreased to be about 0.01 µm by polishing the surface to remove the crushed surface formed by the cutting, by using abrasives such as fine diamond, $CeO_2$, SiC or the like.

Figure 5:
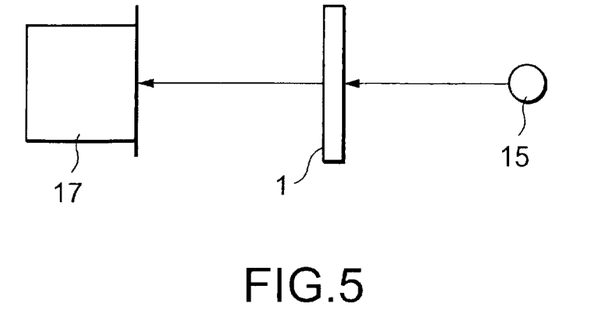
FIG. 5 is a schematic diagram showing a method for measuring a haze (diffuse transmittance/total transmittance)
Figure 6:
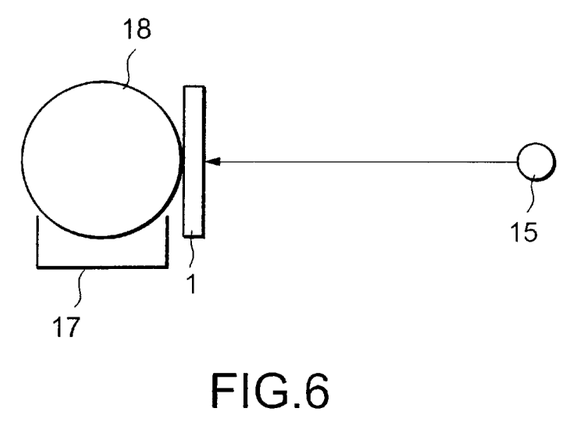
FIG. 6 is another schematic diagram showing a method for measuring a haze (diffuse transmittance/total transmittance)

FIGS. 5 and 6 are schematic diagrams showing a haze measuring equipment. As shown in FIG. 5, a light source 15 is arranged so as to be apart from a ceramic scintillator 1 by 8 cm, and a photomultiplier 17 is arranged so as to be apart from the ceramic scintillator 1 by 6 cm. By using this arrangement, the regular transmittance Tr can be obtained. In order to measure the total transmittance T, the scintillator 1 contacting a window part of an integrating sphere 18 is irradiated with light from the light source 15 as shown in FIG. 6, and the light intensity from another window part of the integrating sphere 18 is measured by the photomultiplier 17. A haze value is defined by a ratio of diffuse transmittance to total transmittance which is equal to (T-Tr)/T. This value is a measure of light scattering; the higher the value, the larger the light scattering.

A ceramic scintillator having the above described surface roughness Ra of 0.01 to 0.40 µm and a thickness of 0.9 mm shows a haze value in the range from 50% to 90%; sufficiently small light scattering. While a ceramic scintillator having the same shape and a surface roughness Ra of 0.5 µm shows a haze value as large as 99.7%; this value is near to that of perfect diffuser. When the light scattering is thus large, the light absorption takes place at the light reflecting layer and the soil on the scintillator in addition to defects within the scintillator during the multiple scattering before the light reaches the photodiode.

Examples of the present invention will be described in detail below.

Comparative Example 1

A rare earth oxysulfide powder expressed by a composition formula $(Gd_{0.999}Pr_{0.001})_2O_2S$ was prepared as a raw material for ceramics. 5 kg of this powder was subjected to a cold isostatic pressing under a pressure of about 200 MPa and then shaped. A resultant cold pressed material was covered with molybdenum foil, and charged into a cylindrical capsule of tantalum. After the internal air was exhuasted, airtight vessel was completed by electron beam welding. Thereafter, the airtight vessel was subjected to a hot isostatic pressing (HIP) under the conditions of 1500° C. and 150 MPa in argon. After this was cooled, the ceramic sintered ingot was taken out of the metal container. This ceramic sintered ingot was cut into a number of scintillator piece of 0.79 mm×2.2 mm×29 mm by using blade-saw and wire-saw. Finally the surface of the scintillators were polished with the abrasive powder of silicon carbide GC2000. This sample was used as Comparative Example 1.

The surface of the scintillator piece (Comparative Example 1) had a roughness Ra of 0.34. The light transmittance was 40% at 500 nm. The X-ray diffraction showed only the $Gd_2O_2S$ phase. Whole the surface area showed green emission of the oxysulfide phase $Gd_2O_2S:Pr$ and no red emission of the oxide phase $Gd_2O_3:Pr$ in the color cathode luminescence image. The light output was 120% of that of a $CdWO_4$ single crystal which had the same shape as that of the ceramics sample under X-ray irradiation at an X-ray tube voltage of 120 kV and 200 mAs. At 100 ms after cessation of X-ray irradiation, the afterglow intensity was 0.015% of the light intensity just before the cessation. The 200 times irradiation at 400 mAs reduced the light output efficiency to 90% of that irradiated only once with X-rays.

EXAMPLE 1

The scintillator piece of the comparative example 1 is treated by the following process so as to obtain the Example 1.

Twenty pieces of the scintillator were placed in a 50 ml alumina crucible. The 50 ml alumina crucible was covered with a lid, and put in a 280 ml alumina crucible. Then, the space outside the 50 ml crucible and inside the 280 ml crucible was filled with $Gd_2O_2S:Pr$ phosphor powder. After the 280 ml crucible was covered with a lid, it was placed in a furnace and heat treated in air at 1100° C. for 5 hours. After cooling, scintillators of the present invention were obtained.

The X-ray diffraction spectrum of a thus heat treated scintillator showed the pattern of the $Gd_2O_3$ phase in addition to that of the $Gd_2O_2S$ phase. The width of the diffraction lines of the $Gd_2O_2S$ was narrower in the scintillator than in Comparative Example 1. In the color cathode luminescence image, the surface area percentage of the red emission part of $Gd_2O_3:Pr$ was 80% and the green emission part of $Gd_2O_2S:Pr$ was 20% with respect to the whole surface of the scintillator. The ceramic scintillator had the same surface roughness Ra of 0.34 $\mu$m as that before the heat treatment. The light transmittance at 500 nm was improved to be 50%. The optical output was 190% of that of a $CdWO_4$ single crystal under the X-ray irradiation. At 100 ms after cessation of X-ray irradiation, the afterglow intensity was 0.0001% of the light intensity before the cessation. The 200 times irradiation at 400 mAs reduced the light output efficiency to 99% of that irradiated only once with X-rays.

EXAMPLE 2

Twenty pieces of Comparative Example 1 were placed in a alumina boat, and the boat was put in a alumina tube furnace. Scintillators were heat treated under nitrogen atmosphere containing 1% of $SO_2$ at 1100° C. for 5 hours. The X-ray diffraction for the obtained pieces shown the oxide $Gd_2O_3$ phase in addition to the $Gd_2O_2S$ phase. The surface area percentage of the red emission part of $Gd_2O_3:Pr$ was 70% with respect to the whole surface of the scintillator in the color cathode luminescence image. The surface roughness Ra was 0.36 $\mu$m. The colorations on the surface and inside the scintillator almost disappeared. The average light output was improved to 180% of that of the $CdWO_4$ single crystal. The variation in the output among the pieces was whithin 1%. The afterglow intensity at 100 ms after cessation of X-ray irradiation was improved to 0.00015%. The average output under the repeated X-ray irradiation is improved to 98%.

EXAMPLES 3 THROUGH 14

Figure 7:
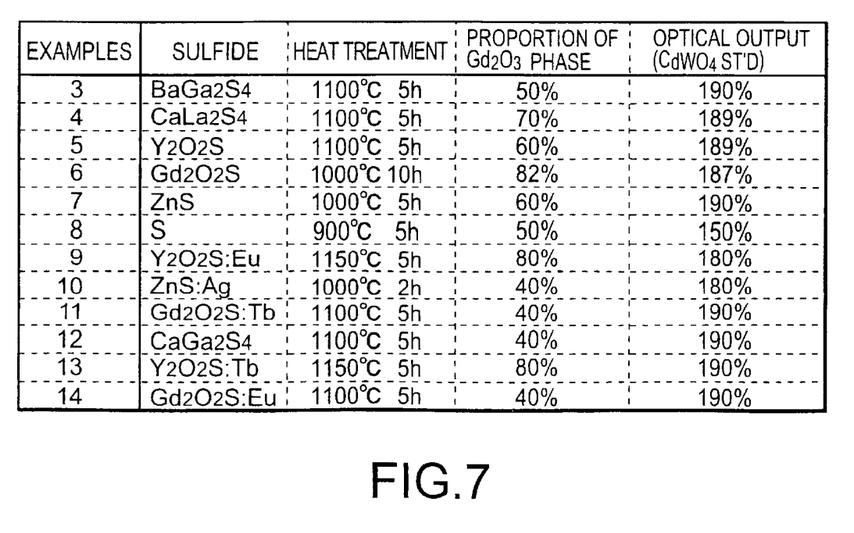
FIG. 7 is a table showing sulfides, heat treatment conditions, percentages of surface phases and optical outputs in examples 3 to 14.

In Examples 3 through 14, various sulfides and heat treatment conditions shown in FIG. 7 were used to obtain $(Gd_{0.999}Pr_{0.001})_2O_2S$ ceramic scintillators similar to Example 1, and the results of the percentages of the $Gd_2O_3$ phase area on the surface thereof and the optical outputs compared with that of the $CdWO_4$ single crystal were obtained. As can be seen clearly from FIG. 7, it was confirmed that the optical output was greatly improved in any one of Examples 3 through 14.

EXAMPLE 15

After a ceramic scintillator was prepared similar to Example 1, the surface thereof was abraded by diamond abrasive grains to prepare a ceramic scintillator having a size of 0.79 mm×2.2 mm×29.0 mm. In this case, the surface roughness Ra was 0.01 $\mu$m, and the surface $Gd_2O_3$ phase was removed by polishing. The optical output was 185% compared with that of the $CdWO_4$ single crystal.

EXAMPLES 16 THROUGH 18

Figure 8:
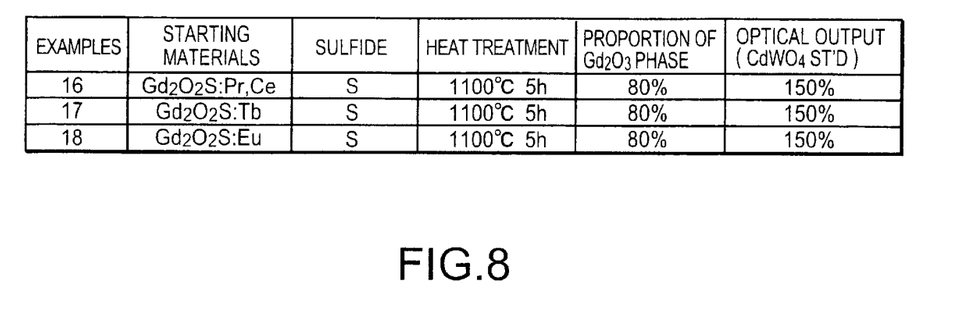
FIG. 8 is a table showing starting materials, sulfides, heat treatment conditions, percentages of surface phases and optical outputs in examples 16 to 18.

In these examples, $Gd_2O_2S:Pr,Ce$, $Gd_2O_2S:Tb$, $Gd_2O_2S:Eu$ were used as starting materials in place of $Gd_2O_2S:Pr$ to prepare ceramic sintered bodies similar to Example 1. Each of the ceramic scintillator bodies was cut to prepare a ceramic scintillator piece having a size of 0.79 mm×2.2 mm x. 29.0 mm. The twenty pieces of the ceramic scintillator were put in an alumina crucible, and 2 g of sulfur was put therein. Then, the alumina crucible was sealed. In the sealed state, a heat treatment was carried out at 1000° C. for 2 hours to obtain ceramic scintillators. Each of the ceramic scintillators has 80% surface $Gd_2O_3$ phase, and the optical output was improved to 150% of the $CdWO_4$ single crystal. The results in Examples 16 through 18 are shown in FIG. 8.

Variation in the optical output among scintillators described in each of Example 1 through 18 was within 1%.

Comparative Example 2

An etching reagent of a mixture of hydrochloric acid and aqueous hydrogen peroxide in a ratio of one to one was used for the surface portion of about 5 $\mu$m thicness of Comparative Example 1 to be dissolved therein. Thereafter, the ceramic was washed with water to prepare a ceramic scintillator. The surface coloration of the Comparative Example disappeared by this procedure. The average optical output was improved to 150% of that of $CdWO_4$. The variation in the output among the pieces, however, was 10%. The afterglow time and the deterioration under repeated X-ray irradiation were not improved. This was reasonable because the afterglow and deterioration may originate from defects inside the scintillator, Comparative Example 3

Twenty pieces of Comparative Example 1 were placed in a alumina boat, and the boat was put in an alumina tube furnace. Scintillators were heat treated under nitrogen atmosphere containing 100 ppm oxygen at 1100° C. for 5 hours. The X-ray diffraction for the obtained pieces showed only the oxide $Gd_2O_3$ phase. No green emission of the oxysulfide phase $Gd_2O_2S$:Pr was observed in the color cathode luminescence image. While the surface coloration disappeared, light scattering on the surface increased, and the surface roughness value Ra was 0.9 μm. Coloration inside the scintillator pieces almost disappeared, and the light transmittance at 500 nm was increased to 50%. The average light output was improved to 170% of that of the $CdWO_4$ single crystal. The variation in the output among the pieces, however, was 5%, and higher than the present invention. The afterglow intensity at 100 ms after cessation of X-ray irradiation was rather improved to 0.005%. The average deterioration under the repeated X-ray irradiation is improved to 95%, but this value was significantly lower than that obtained in the present invention. These results were reasonable because the sulfur deficiency inside the scintillator could not be removed although oxygen deficiency could be removed by the oxygen supplying.

As described in detail above, according to a ceramic scintillator and a method for producing the same according to the present invention, it is possible to remove the oxygen deficiency and sulfur deficiency produced during sintering, and it is possible to remove distortion and stress to decrease the internal coloring. Moreover, it is possible to remove the surface coloring caused by cutting. Thus, it is possible to improve the optical output. In addition, it is possible to shorten afterglow and to inhibit deterioration under repeated X-ray irradiation.

As can be seen clearly from the foregoing, according to the present invention, a ceramic scintillator comprises a sintered body of a rare earth oxysulfide, and a rare earth oxide phase formed on the surface of the sintered body, the ceramic scintillator being formed by a method comprising: a process for placing a sintered body and a sulfide which serves as a supplier of at least one of $SO_2$ and $SO_3$ to react with the sintered body of the rare earth oxysulfide in a substantially sealed crucible containing oxygen; a process for heat-treating the sintered body and sulfide, which are placed in the crucible, at a temperature of 900 to 1200° C.; and a process for abrading the surface of the sintered body, which has been taken out of the sealed crucible and on which an oxide phase and an oxysulfide phase have been deposited.

Referring to FIGS. 9 through 13, the second through fourth preferred embodiments of the present invention relating to the technical field, to which the above described ceramic scintillator is applied, will be described in detail below.

Figure 9:
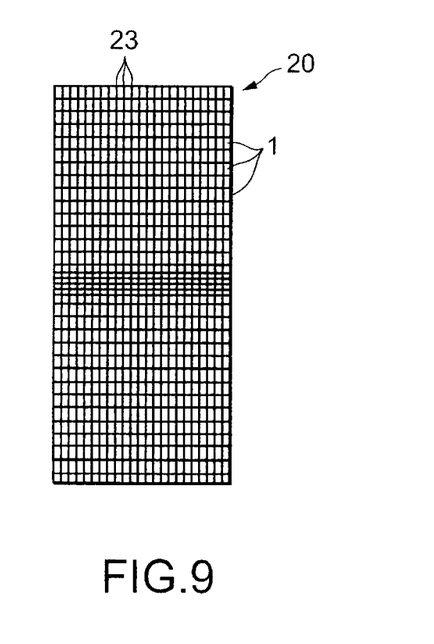
FIG. 9 is a plan view of the second preferred embodiment of a scintillator block according to the present invention.

FIG. 9 is a plan view of the second preferred embodiment of a scintillator block according to the present invention, which is assembled using the above described first preferred embodiment of a ceramic scintillator according to the present invention. In this figure, a scintillator block 20 comprises a large number of ceramic scintillators 1 shown in FIG. 2 or 3, which are arranged lengthwise and breadthwise, and reflectors 23, each of which is provided between adjacent ceramic scintillators 1. The scintillator block thus formed is combined with a photoelectric transducer part and collimator, which will be described later, to be mounted in an X-ray detector.

That is, the second preferred embodiment of a scintillator block according to the present invention comprises: a plurality of rectangular rod-like ceramic scintillators integrated lengthwise and breadthwise, each of the ceramic scintillators being in a state wherein rare earth oxysulfide phases or rare earth oxide phases are dispersed on the surface of a sintered body serving as a raw material; and a plurality of reflectors, each of which is provided between adjacent two of the ceramic scintillators.

When the scintillator is irradiated with X-rays at an X-ray tube voltage of 120 kV and 200 mAs, the output current value from the photoelectric transducer (not shown) was higher, by 30%, than that using the above described scintillator of Comparative Example 2. In addition, the variation in the output current from the photoelectric transducers each of which corresponds to a scintillator in the block was within 5%, and ring-shaped artifact due to the difference in the light output efficiency among scintillators did not appear in the obtained tomography image.

Figure 10:
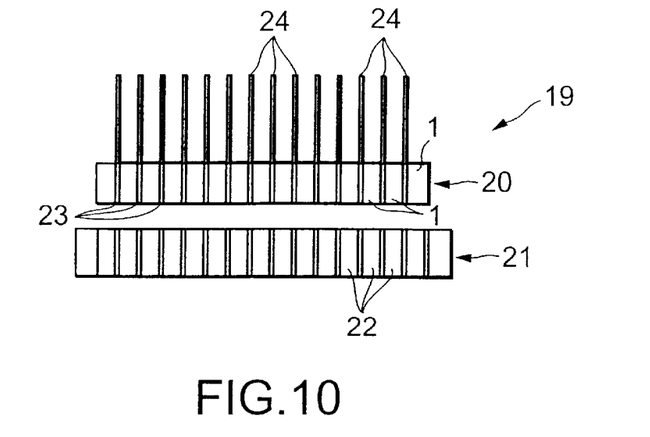
FIG. 10 is a schematic diagram showing the third preferred embodiment of an X-ray detector according to the present invention.
Figure 11:
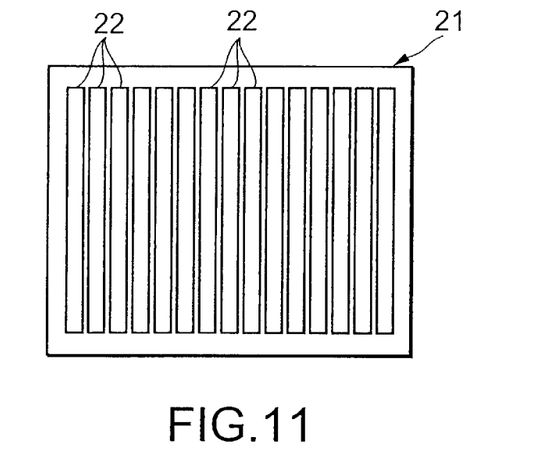
FIG. 11 is a plan view of a photoelectric transducer part for use in the X-ray detector of FIG. 10.
Figure 12:
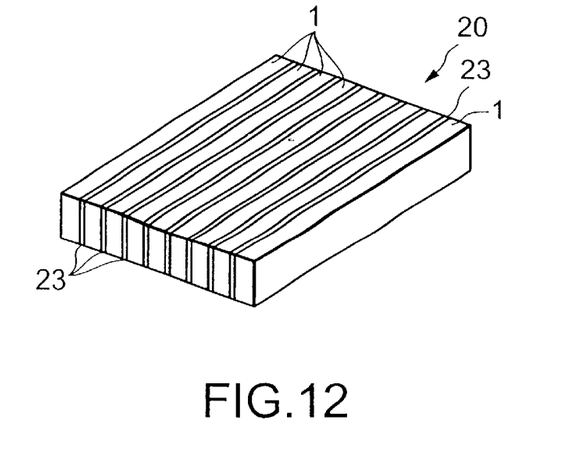
FIG. 12 is a perspective view of a block including scintillators and reflectors.

FIGS. 10 through 12 are schematic diagrams for explaining the third preferred embodiment of an X-ray detector according to the present invention. In FIG. 10, an X-ray detector 19 comprises a scintillator block 20 and a photoelectric transducer 21. As shown in FIG. 11, the photoelectric transducer 21 comprises a plurality of photodiodes 22 assembled so as to be arranged in one dimensional direction. Above the photoelectric transducer 21, there is arranged the scintillator block 20, which has also been described in the second preferred embodiment shown in FIG. 9. The detailed construction thereof is shown in FIG. 12. In FIGS. 10 and 12, a plurality of scintillators 1, each of which is the same as the above described scintillator 1, are arranged, and each of a plurality of reflectors 23 for reflecting light from the scintillator 1 is provided between adjacent scintillators 1. Above the scintillator block 20, a collimator 24 for regulating the direction of incidence of X-rays is provided for blocking X-rays being incident in an oblique direction to introduce only X-rays being incident in a direction perpendicular to the scintillator block 20.

As described in the second preferred embodiment, the output current value measured when the X-ray detector 19 was irradiated with X-rays at an X-ray tube voltage of 120 kV and 200 mAs was higher, by 30%, than that in the case of the X-ray detector using the above described scintillator prepared in Comparative Example 2. In addition, as described above, the variation in the output current from the photoelectric transducers each of which corresponds to a scintillator in the block was within 5%. Moreover, similar to the second preferred embodiment, the artifact due to the difference in the light output efficiency among scintillators did not appear in the obtained tomography image.

Therefore, in the third preferred embodiment, an X-ray detector comprises a collimator for regulating the incident direction of X-rays, a scintillator block comprising ceramic scintillators arranged in a longitudinal direction via reflectors, and a photoelectric transducer part having photodiodes, each of which corresponds to one of the ceramic scintillators of the scintillator block, each of the ceramic scintillators comprising a sintered body of a rare earth oxysulfide and a rare earth oxide phase formed on the surface of the sintered body, each of the ceramic scintillators being formed by a method comprising: a process for placing a sintered body and a sulfide which serves as a supplier of at least one of $SO_2$ and $SO_3$ to react with the sintered body of the rare earth oxysulfide in a substantially sealed crucible containing oxygen; a process for heat-treating the sintered body and sulfide, which are placed in the crucible, at a temperature of 900 to 1200° C.; and a process for abrading the surface of the sintered body, which has been taken out of the sealed crucible and on which an oxide phase and an oxysulfide phase have been deposited.

Figure 13:
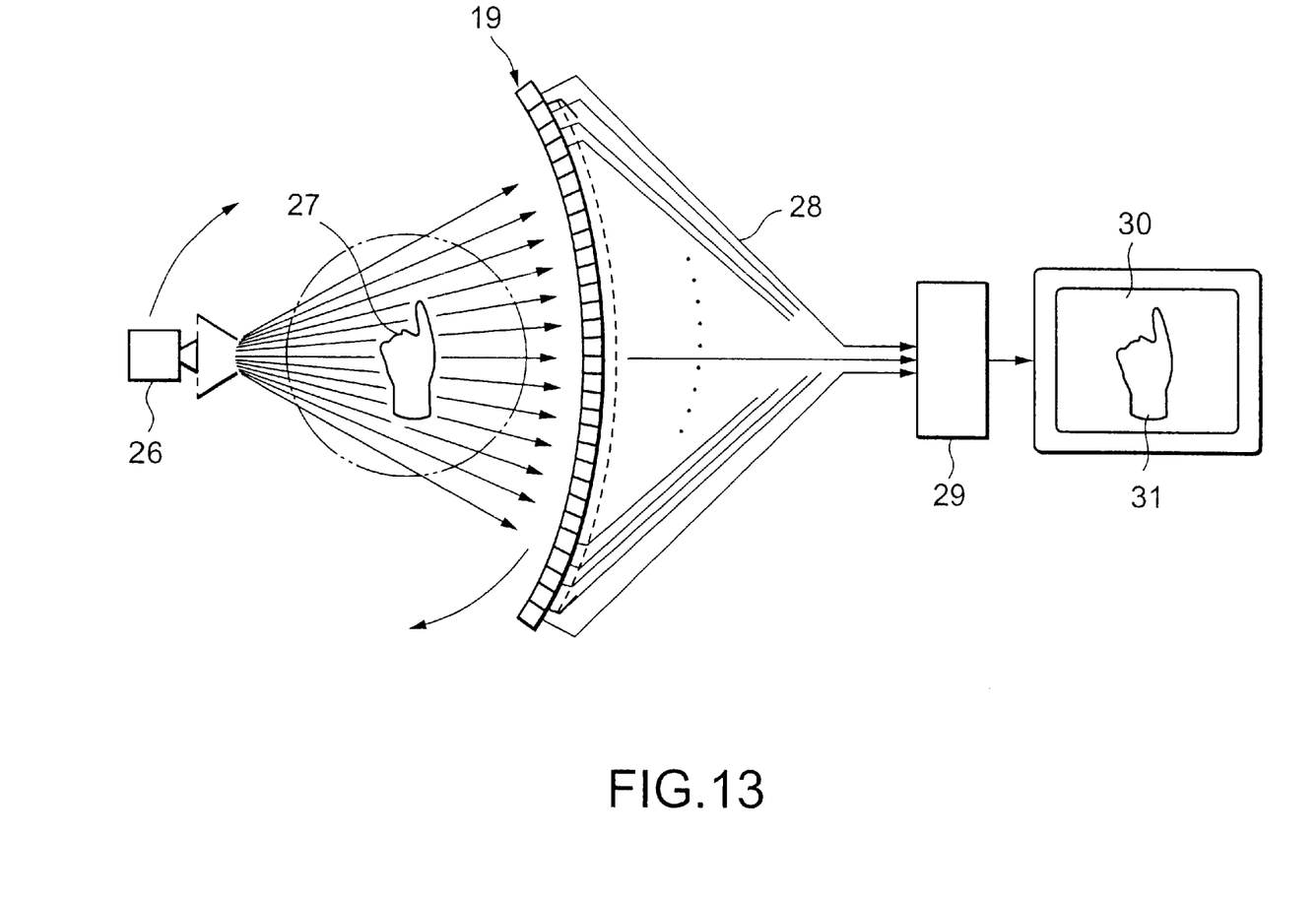
FIG. 13 is a sectional view showing the whole construction of the fourth preferred embodiment of an X-ray CT equipment according to the present invention.

Referring to FIG. 13, the fourth preferred embodiment of a CT imaging equipment according to the present invention, which uses the X-ray detector 19 in the third preferred embodiment, will be described below. In FIG. 13, several tens of the X-ray detectors 19 in the third preferred embodiment are arcuately arranged on the inner wall of an X-ray signal converting unit of the CT equipment. In the vicinity of the center of the arc, on which the X-ray detectors 19 are arranged, an X-ray tube 26 for emitting X-rays is provided so as to emit X-rays toward the X-ray signal converting unit. The X-ray tube 26 and the X-ray signal converting unit rotate about the fixed subject 27 in the direction of an arcuate arrow, so that X-ray detectors 19 pickup X-ray intensities through the subject 27 from different angles.

The X-ray detector 19 corresponds to the X-ray detector 19 in the third preferred embodiment described referring to FIG. 13. The X-ray detector 19 is provided with a collimator, a scintillator block and a photoelectric transducer part in the order from the side of the X-ray tube 26. Reference number 28 denotes signal lines for connecting the photoelectric transducer part (not shown in FIG. 13 and reference number 21 in FIG. 10) of the X-ray detector 19 to a computer 29 having data accumulation and processing functions. The signals inputted to the computer 29 are processed to display a tomography image 31 of the subject on the screen of an image display device 30.

Therefore, in the forth preferred embodiment, an X-ray CT imaging equipment comprises: an X-ray tube for emitting X-rays at a predetermined angle; an X-ray signal converting unit comprising several tens of X-ray detectors which include collimators, scintillator blocks, and photoelectric transducer parts; a computer for data accumulation and processing of electric current signals outputted from the photoelectric transducer parts; and a display device for displaying an image produced by the processing carried out by the computer. The ceramic scintillator block of the X-ray detector comprises a plurality of ceramic scintillators, each of the ceramic scintillators comprising a sintered body of a rare earth oxysulfide and a rare earth oxide phase formed on the surface of the sintered body, each of the ceramic scintillators being formed by a method comprising: a process for placing a sintered body and a sulfide which serves as a supplier of at least one of $SO_2$ and $SO_3$ to react with the sintered body of the rare earth oxysulfide in a substantially sealed crucible containing oxygen; a process for heat-treating the sintered body and sulfide, which are placed in the crucible, at a temperature of 900 to 1200° C.; and a process for abrading the surface of the sintered body, which has been taken out of the sealed crucible and on which an oxide phase and an oxysulfide phase have been deposited.

As described in detail above, according to a ceramic scintillator, a method for producing the same, an X-ray detector and X-ray CT imaging equipment using the ceramic scintillator according to the present invention, it is possible to remove the oxygen deficiency and sulfur deficiency during the sintering of a ceramic scintillator, and it is possible to remove distortion and stress to decrease the internal coloring. Moreover, it is possible to remove the surface coloring caused by cutting. Thus, it is possible to improve the optical output. In addition, it is possible to shorten afterglow and to inhibit deterioration under repeated X-ray irradiation. When such an excellent ceramic scintillator is applied to an X-ray detector and an X-ray CT imaging equipment, it is possible to obtain a high quality tomography image. Thus, by using a ceramic scintillator according to the present invention, it is possible to provide various excellent advantages to various fields of application including an X-ray detector and a CT imaging equipment.

What is claimed is:

1. A method for producing a ceramic scintillator having an improved optical output characteristic, said method comprising the steps of:
   providing a sintered body formed of a rare earth oxysulfide;
   producing at least one of $SO_2$ and $SO_3$; and
   reacting said at least one of $SO_2$ and $SO_3$ with said sintered body at a temperature of 900 to 1,200° C.

2. A method for producing a ceramic scintillator as set forth in claim 1, which further comprises the steps of:
   placing a sintered body and a sulfide which generates at least one of $SO_2$ and $SO_3$, in a substantially sealed container containing oxygen; and
   heat-treating said sintered body and said sulfide, which are placed in said container, at a temperature of 900 to 1200° C.

3. A ceramic scintillator having an improved optical output characteristic, comprising a sintered body of a rare earth oxysulfide and a rare earth oxide phase including $Gd_2O_3$ formed on the surface of said sintered body, said ceramic scintillator being produced by:
   placing the sintered body and a sulfide capable of generating at least one of $SO_2$ and $SO_3$ in a substantially sealed container containing oxygen;
   heat-treating said sintered body and the sulfide inside said container at a temperature of 900 to 1,200° C.; and
   abrading the surface of said sintered body, which has been taken out of said sealed container and on which the rare earth oxide phase and an oxysulfide phase have been deposited.

4. A ceramic scintillator having an improved optical output characteristic, comprising a sintered body of a rare earth oxysulfide and a rare earth oxysulfide phase or a rare earth oxide phase including $Gd_2O_3$ dispersed on a surface of said sintered body.

5. A ceramic scintillator as set forth in claim 4, wherein said surface has a mean surface roughness Ra which is greater than or equal to 0.01 $\mu$m and which is smaller than 0.8 $\mu$m.

6. A scintillator block comprising:
   a plurality of rectangular rod-like ceramic scintillators integrated lengthwise and breadthwise, each of said ceramic scintillators being in a state wherein a rare earth oxysulfide phase or a rare earth oxide phase including $Gd_2O_3$ is dispersed on the surface of a sintered body serving as a raw material; and
   a plurality of reflectors, each of which is provided between adjacent two of said ceramic scintillators.

7. An X-ray detector comprising:
   a collimator for regulating the incident direction of X-rays;
   a scintillator block including ceramic scintillators arranged via reflectors; and
   a photoelectric transducer part having photodiodes, each of which corresponds to one of said ceramic scintillators of said scintillator block, each of the ceramic scintillators comprising a sintered body of a rare earth oxysulfide, and a rare earth oxide phase including $Gd_2O_3$ formed on the surface of said sintered body, each of the ceramic scintillators being produced by:

placing the sintered body and a sulfide capable of generating at least one of $SO_2$ and $SO_3$ in a substantially sealed container containing oxygen;

heat-treating said sintered body and the sulfide inside said container at a temperature of 900 to 1,200° C.; and abrading the surface of said sintered body, which has been taken out of said sealed container and on which the rare earth oxide phase and an oxysulfide phase have been deposited.

8. An X-ray CT imaging equipment comprising:

an X-ray tube for emitting at a predetermined angle;

an X-ray signal converting unit comprising several tens of X-ray detectors which include collimators, scintillator blocks, and photoelectric transducer parts for detecting said X-rays emitted from said X-ray tube through an object to be picked up;

a computer for data accumulation and processing of electric current signals outputted from the photoelectric transducer parts; and a display device for displaying an image reproduced by the processing carried out by said computer, said ceramic scintillator block of said X-ray detector comprising a plurality of ceramic scintillators, each of the ceramic scintillators comprising a sintered body of a rare earth oxysulfide, and a rare earth oxide phase including $Gd_2O_3$ formed on the surface of said sintered body, each of the ceramic scintillators being produced by:

placing the sintered body and a sulfide capable of generating at least one of $SO_2$ and $SO_3$ in a substantially sealed container containing oxygen;

heat-treating said sintered body and the sulfide inside said container at a temperature of 900 to 1,200° C.; and abrading the surface of said sintered body, which has been taken out of said sealed container and on which the rare earth oxide phase and an oxysulfide phase have been deposited.

\* \* \* \* \*